US011233782B2

(12) United States Patent
Giorgi et al.

(10) Patent No.: US 11,233,782 B2
(45) Date of Patent: Jan. 25, 2022

(54) SINGLE NODE NETWORK CONNECTIVITY FOR STRUCTURE AUTOMATION FUNCTIONALITY

(71) Applicants: Michael E. Giorgi, Hudson, OH (US); Patrick M. Mause, Streetsboro, OH (US); Steven Rosen, Hunting Valley, OH (US)

(72) Inventors: Michael E. Giorgi, Hudson, OH (US); Patrick M. Mause, Streetsboro, OH (US); Steven Rosen, Hunting Valley, OH (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 217 days.

(21) Appl. No.: 16/151,391

(22) Filed: Oct. 4, 2018

(65) Prior Publication Data

US 2019/0104119 A1    Apr. 4, 2019

Related U.S. Application Data

(60) Provisional application No. 62/568,289, filed on Oct. 4, 2017.

(51) Int. Cl.
  *H04L 29/06* (2006.01)
  *H04L 9/32* (2006.01)
  (Continued)

(52) U.S. Cl.
  CPC .......... *H04L 63/0823* (2013.01); *H04L 9/321* (2013.01); *H04L 9/3226* (2013.01);
  (Continued)

(58) Field of Classification Search
  USPC ....................................................... 713/156
  See application file for complete search history.

(56) References Cited

U.S. PATENT DOCUMENTS 5,251,815 A   10/1993 Foye
5,991,429 A   11/1999 Coffin et al.
(Continued)

FOREIGN PATENT DOCUMENTS

CN   105425711 A   3/2016
JP   H0677558 B2  10/1994
(Continued)

OTHER PUBLICATIONS

Sharma et al., "Enhancing Online Banking Authentication using Hybrid Cryptographic method", IEEE-CICT 2017, pp. 1-8 (Year: 2017).*

(Continued)

*Primary Examiner* — Khalil Naghdali
(74) *Attorney, Agent, or Firm* — Amin, Turocy & Watson, LLP

(57) ABSTRACT

Facilitating single node network connectivity for structure automation functionality is provided herein. A system can comprise a memory that stores executable components and a processor, operatively coupled to the memory, that executes the executable components. The executable components can comprise a management component that facilitates a communication with electronic devices within a structure and an initialization component that enables a streamlined security process based on an indication that the at least one electronic device is to be registered with the management component. Further, the executable components can comprise a negotiation component that performs a certificate authentication for the at least one electronic device. The certificate authentication can be automatically performed with a certificate authority during a backend process.

20 Claims, 10 Drawing Sheets

(51) Int. Cl.
*H04W 12/08* (2021.01)
*H04W 12/63* (2021.01)
*H04W 12/069* (2021.01)
*H04L 29/08* (2006.01)
*H04W 4/02* (2018.01)
*H04W 4/70* (2018.01)
*H04W 4/021* (2018.01)

(52) U.S. Cl.
CPC .......... *H04L 9/3231* (2013.01); *H04L 9/3263* (2013.01); *H04L 63/102* (2013.01); *H04L 63/107* (2013.01); *H04W 12/069* (2021.01); *H04W 12/08* (2013.01); *H04W 12/63* (2021.01); *H04L 67/12* (2013.01); *H04L 2209/805* (2013.01); *H04L 2209/84* (2013.01); *H04W 4/021* (2013.01); *H04W 4/023* (2013.01); *H04W 4/70* (2018.02)

(56) References Cited

U.S. PATENT DOCUMENTS

| | | | |
|---|---|---|---|
| 6,578,675 | B2 | 6/2003 | Wilson et al. |
| 9,696,055 | B1 | 7/2017 | Goodman et al. |
| 2002/0066621 | A1 | 6/2002 | Wilson et al. |
| 2005/0144437 | A1* | 6/2005 | Ransom ................ G06F 21/606 713/151 |
| 2006/0252530 | A1* | 11/2006 | Oberberger ......... G07F 17/3218 463/29 |
| 2007/0106892 | A1* | 5/2007 | Engberg ................ H04L 69/329 713/168 |
| 2009/0139781 | A1 | 6/2009 | Straubel |
| 2010/0104935 | A1 | 4/2010 | Hermann et al. |
| 2011/0223450 | A1 | 9/2011 | Horne et al. |
| 2011/0247351 | A1 | 10/2011 | Alston |
| 2012/0190386 | A1 | 7/2012 | Anderson |
| 2013/0008958 | A1 | 1/2013 | Smith et al. |
| 2013/0069543 | A1 | 3/2013 | Mohan et al. |
| 2013/0171491 | A1 | 7/2013 | Wei et al. |
| 2013/0318343 | A1* | 11/2013 | Bjarnason ............... H04L 63/08 713/157 |
| 2013/0340802 | A1 | 12/2013 | Jovovic et al. |
| 2013/0346226 | A1 | 12/2013 | Nunes |
| 2014/0032034 | A1 | 1/2014 | Raptopoulos et al. |
| 2014/0132390 | A1 | 5/2014 | Loveland et al. |
| 2014/0214504 | A1 | 7/2014 | Young et al. |
| 2015/0088312 | A1 | 3/2015 | Lo et al. |
| 2016/0034712 | A1 | 2/2016 | Patton et al. |
| 2016/0174334 | A1 | 6/2016 | Anthony et al. |
| 2016/0183037 | A1 | 6/2016 | Grohman |
| 2016/0196131 | A1* | 7/2016 | Searle ................... H04L 29/06 717/173 |
| 2016/0294605 | A1* | 10/2016 | Searle .................. H04L 41/082 |
| 2016/0325962 | A1 | 11/2016 | Blandin et al. |
| 2016/0335865 | A1 | 11/2016 | Sayavong et al. |
| 2017/0108236 | A1 | 4/2017 | Guan et al. |
| 2017/0178084 | A1 | 6/2017 | Barreira-Avegliano et al. |
| 2017/0309977 | A1 | 10/2017 | Subba et al. |
| 2017/0346295 | A1 | 11/2017 | Yoscovich et al. |
| 2017/0369184 | A1 | 12/2017 | Di Benedetto et al. |
| 2018/0176017 | A1* | 6/2018 | Rodriguez .......... H04L 63/0861 |
| 2018/0247474 | A1 | 8/2018 | Matsuyama |
| 2018/0249297 | A1 | 8/2018 | Taylor |
| 2019/0109477 | A1 | 4/2019 | Giorgi et al. |

FOREIGN PATENT DOCUMENTS

| | | |
|---|---|---|
| JP | 2002216038 A | 8/2002 |
| JP | 2016048473 A | 4/2016 |
| WO | 2016048473 A1 | 3/2016 |

OTHER PUBLICATIONS

Non-Final Office Action received for U.S. Appl. No. 16/151,387 dated Jan. 27, 2020, 29 pages.
Final Office Action received for U.S. Appl. No. 16/151,387 dated Jun. 18, 2020, 39 pages.
Non-Final Office Action received for U.S. Appl. No. 16/151,387 dated Mar. 22, 2021, 66 pages.
Non-Final Office Action received for U.S. Appl. No. 16/151,396 dated Jan. 13, 2021, 23 pages.
Final Office Action received for U.S. Appl. No. 16/151,396 dated Apr. 23, 2021, 36 pages.
Non-Final Office Action received for U.S. Appl. No. 16/151,412 dated Aug. 17, 2020, 25 pages.
Final Office Action received for U.S. Appl. No. 16/151,412 dated Feb. 10, 2021, 41 pages.
Notice of Allowance received for U.S. Appl. No. 16/206,320 dated Feb. 28, 2020, 18 pages.
Non-Final Office Action received for U.S. Appl. No. 16/151,424 dated Feb. 12, 2020, 24 pages.
Final Office Action received for U.S. Appl. No. 16/151,424 dated May 26, 2020, 21 pages.
Non-Final Office Action received for U.S. Appl. No. 16/151,424 dated Nov. 3, 2020, 19 pages.
Mel et al., "The NIST Definition of Cloud Computing", National Institute of Standards and Technology, Special Publication 800-145, Sep. 2011, 7 pages.
Non-Final Office Action received for U.S. Appl. No. 16/151,396 dated Oct. 27, 2021, 57 pages.

\* cited by examiner

SINGLE NODE NETWORK CONNECTIVITY FOR STRUCTURE AUTOMATION FUNCTIONALITY

CROSS-REFERENCE TO RELATED APPLICATIONS

This application claims priority to U.S. Provisional Patent Application Ser. No. 62/568,289 filed on Oct. 4, 2017, entitled "SINGLE NODE NETWORK CONNECTIVITY FOR STRUCTURE AUTOMATION FUNCTIONALITY." The entirety of the aforementioned application is incorporated by reference herein.

TECHNICAL FIELD

The subject disclosure relates to systems, computer-implemented methods, apparatuses, and/or computer program products that facilitate single node network connectivity for structure automation functionality.

BACKGROUND

The advancement of computing technology has evolved into an inter-networking of devices with the capability to collect and exchange data, which is referred to as the Internet of Things (IoTs). Devices that can be utilized as IoT devices include physical devices, vehicles, objects, and other items embedded with communication capabilities. Through the utilization of the IoT devices, various entities can interact with connected computing assets over a communications network. Unique challenges exist to increase the capabilities of IoT devices, as well as to improve the operation and management of IoT devices.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a system that can comprise a memory that stores executable components and a processor, operatively coupled to the memory, that executes the executable components. The executable components can comprise a management component that facilitates a communication with electronic devices within a structure. At least one electronic device of the electronic devices can be classified as an internet of things device. The executable components can also comprise an initialization component that can enable a streamlined security process based on an indication that the at least one electronic device is to be registered with the management component. Further, the executable components can comprise a negotiation component that can perform a certificate authentication for the at least one electronic device. The certificate authentication can be automatically performed with a certificate authority during a backend process. Further, the communication by the at least one electronic device can be facilitated through the management component based on a successful certification authentication by the negotiation component.

Also, in one or more embodiments, provided is a method that can comprise facilitating, by a system comprising a processor, a communication link between a controller unit, a first device, and a second device within a structure. The method can also comprise negotiating, by the system, a first authentication of the first device and a second authentication of the second device during a backend process of the controller unit. A manual configuration of the first device and the second device can be bypassed. Further, the method can comprise providing, by the system, security of the first device and the second device based on a registration with the controller unit. The registration can be enabled based on the first authentication and the second authentication.

In addition, according to one or more embodiments, provided is machine-readable storage medium, comprising executable instructions that, when executed by a processor, facilitate performance of operations. The operations can comprise establishing a communication with electronic devices within a structure. At least one electronic device of the electronic devices can be classified as an internet of things device. The operations can also comprise enabling a streamlined security process based on an indication that the at least one electronic device is to be registered. Further, the operations can comprise performing a certificate authentication for the at least one electronic device. The certificate authentication can be automatically performed with a certificate authority during a backend process. The communication by the at least one electronic device can be facilitated based on a successful certification authentication.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Discussed herein are various aspects that can relate to a controller unit that, as a single node, can provide network connectivity for structure automation functionality. The controller unit can communicate with various other devices, including Internet of Things (IoT) devices and non-IoT devices, including network enabled devices such as laptop computers, mobile phones, smart phones, and so on. Additionally, the controller unit can function as a router or access point to enable other network connectivity. For example, the controller unit can receive access to an internet connection wirelessly, via a wireless local area network (WLAN) port, or via another communications network. Based on the internet connection, the controller unit can operate as a router for other computing devices, in addition to the IoT devices.

Figure 1:
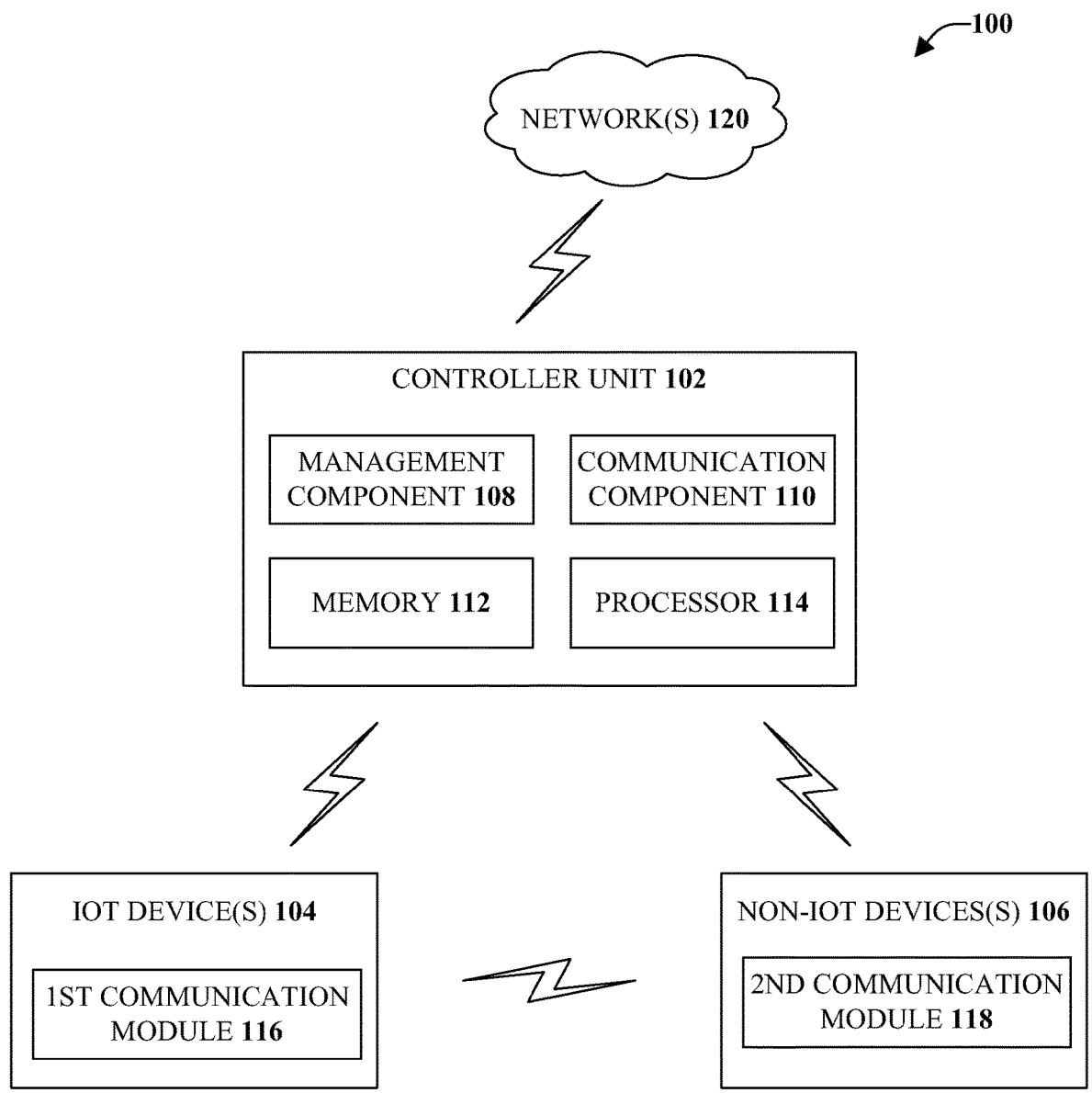
FIG. 1 illustrates an example, non-limiting, system for facilitating wireless communications functionality in accordance with one or more embodiments described herein.

FIG. 1 illustrates an example, non-limiting, system 100 for facilitating wireless communications functionality in accordance with one or more embodiments described herein. Aspects of the systems, apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

As illustrated, the system 100 can include a controller unit 102, one or more IoT devices, and one or more non-IoT devices. The one or more IoT devices can be devices that can be utilized to implement structure automation functionality. The non-IoT devices can be various other communications devices that have computing and communication capability including, but not limited to, personal computers, mobile phones, smart phones, tablets, and so on.

It is noted that although only a single IoT device 104 and a single non-IoT device 106 are illustrated for purposes of simplicity, according to various aspects there can be a multitude of IoT devices and a multitude of non-IoT devices. In some implementations, there can be hundreds, or even thousands, of IoT devices and/or non-IoT devices that can be managed by the controller unit 102 in accordance with the various aspects discussed herein.

The one or more IoT devices and the one or more non-IoT devices managed by the controller unit 102 can be devices located within a defined geographic area, such as a house or other structure (e.g., office, building, apartment complex, factory, and so on). In some implementations, the IoT devices and the non-IoT devices managed by the controller unit 102 can be devices located within a portion of a structure.

According to some implementations, the structure can include more than one controller unit, where the one or more controller units manage respective devices throughout the structure. For example, a first controller unit can communicate with, and control, a first set of devices, a second controller unit can communicate with, and control, a second set of devices, and so on. The first controller unit and the second controller unit can comprise one or more of the components and/or functionality of the controller unit 102 of FIG. 1. Further, the first set of devices and the second set of devices can comprise one or more of the components and/or functionality of the IoT device 104 and/or the non-IoT device 106.

The placement of more than one controller unit in a structure can be based on the size of the structure (e.g., multiple floors, length of the structure), layout of the structure (e.g., an office building might include multiple tenants and respective central devices can be utilized for the tenants), or based on other considerations. For example, a thermostat in a house (or other structure) can be included in a controller unit that can communicate with devices throughout the structure. Various devices around the structure can be utilized to provide the structure automation functionality.

As an example, IoT devices can be utilized within a "smart home." For example, a home (or other structure) can include "smart devices," which can be in the form of appliances, products, devices, and elements that are capable of accessing the Internet (e.g., going online) and being accessed and/or capable of communication. By way of example and not limitation, smart home components can include sensor-equipped white goods, security, lighting, heating, ventilation, entertainment, doorbells, washing machines, clothes dryers, televisions, and coffee makers, among others. These devices can be connected to a local server or gateway, which can be accessed by the appropriate service providers. Various home automation solutions for energy management, security, remote monitoring and control, and e-health can offer various advantages and improve how people conduct their lives. The list of smart home applications is open-ended. Although the various IoT devices can connect to a server or gateway to gain Internet connectivity, the IoT devices are not capable of communication among each other when the devices are from different manufacturers that utilize specialized protocols for communication by the respective devices.

The controller unit 102 can comprise a management component 108, a communication component 110, at least one memory 112, and at least one processor 114. The remote devices can comprise respective communication modules. For example, the IoT device 104 can comprise a first communication module 116 and the non-IoT device 106 can comprise a second communication module 118. Other devices, both non-IoT devices and IoT devices, can comprise respective communication modules. Further, the IoT device 104, the non-IoT device 106, other IoT devices, and/or other non-IoT devices can comprise respective memories and processors.

The management component 108 can facilitate control of the IoT device 104 and the non-IoT device 106. For example, the management component 108 can activate and/or deactivate the IoT device 104 based on one or more parameters. According to an implementation, the one or more parameters can include a presence of one or more individuals near the IoT device 104. For example, if the IoT device 104 is associated with a lighting element, the management component 108 can cause the lighting element to activate (e.g., turn on) when the person is in the room, or is about to enter the room. After the person leaves the room, the management component 108 can cause the lighting element to deactivate (e.g., turn off). In another example, when the management component 108 determines the individual is leaving the premises, the management component 108 can automatically activate a security system associated with the premises. Various other IoT devices can also be managed by the management component 108 based on location of individuals within the structure.

The communication component 110 can facilitate a communication between the controller unit 102, IoT device 104, and/or the non-IoT device 106, over one or more local networks. For example, the communication with the IoT device 104 can be via the first communication module 116 and the communication with the non-IoT device can be via the second communication module 118. Other devices can comprise respective communication modules.

Further, the communication component 110 can facilitate communication between the IoT device 104, the non-IoT device 106, other IoT devices, and/or other non-IoT devices. For example, communication between devices within the structure can be facilitated by the communication component 110. For example, the controller unit 102 can define a standard communications protocol (e.g., a Building Automation and Control Network or BACnet) that can allow the IoT devices to communicate and can enable IoT functionality for legacy non-IoT devices.

In accordance with some implementations, the communication component 110 can facilitate communication between the devices within the structure (e.g., the IoT device 104, the non-IoT device 106) to devices or systems external to the structure over one or more external networks 120. According to some implementations, the communication (e.g., either on the local network or over the one or more external networks 120) can be wireless. However, the disclosed aspects are not limited to this implementation and at least some communication can be performed through a wired connection, or a combination of wired and wireless connections.

According to some implementations, the controller unit 102 can be a local Machine to Machine (M2M) management device. M2M is a broad term that can be used to describe technology that can enable networked devices to exchange information and perform actions without manual assistance (e.g., by a human) M2M technologies can be utilized to connect a multitude of devices within a single network. Such connected devices can include any device that has computing and communication technology (e.g., vehicles, buildings, appliances, vending machines, medical equipment, industrial equipment, and so on). For example, an electrical device that is capable of being activated/deactivated (e.g., turned on and off, such as through an on/off switch) can be connected to another electrical device capable of being activated/deactivated via a wired network and/or a wireless network. Accordingly, these electrical devices have the capability to perform M2M communications, which is referred to as Machine Type Communications (MTC).

M2M communication and/or MTC can be used for a variety of purposes in a wide range of applications and, therefore, can offer several benefits to industry, business, and individuals. Further, M2M communication can enable IoT and other applications, such as home automation systems, mobile healthcare, telemetry, and so on.

The one or more local networks and the one or more external networks 120 can include various types of networks that can facilitate M2M or MTC (it is noted that the terms MTC and M2M can be used interchangeably). For example, the one or more local networks and the one or more external networks 120 can include, but are not limited to: cellular networks, femto networks, picocell networks, microcell networks, internet protocol (IP) networks Wi-Fi service networks, broadband service network, enterprise networks, cloud based networks, and the like. The devices of the system 100 (e.g., the controller unit 102, the IoT device 104, the non-IoT device 106, and the like) can employ various wireless communication technologies to facilitate wired and/or wireless radio communications between the devices. For example, these communication technologies can include but are not limited to: Universal Mobile Telecommunications System (UMTS) technologies, LTE technologies, advanced LTE technologies (including voice over LTE or VoLTE), narrowband IoT (NB-IoT), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology, BLUETOOTH® technologies, BLUETOOTH® low energy (BLE) technologies, near field communication (NFC), RF4CE, WirelessHART, 6LoWPAN, Z-Wave, ANT, and the like.

As discussed above, the communication component 110 can facilitate communication with the IoT device 104 and the non-IoT device 106 over one or more local networks, which can be a subsystem. For example, the subsystem can be an M2M subsystem that can comprise two or more communicatively coupled M2M devices (e.g., the IoT device 104, the non-IoT device 106, another IoT device, another non-IoT device, and so on) that can be configured to exchange information and perform one or more actions that facilitate network connectivity for IoT device and non-IoT devices.

According to some implementations, the management component 108 can enable communication (via the communication component 110) among the IoT devices and/or the non-IoT devices. For example, a first IoT device can utilize a first communication protocol and a second IoT device (or a non-IoT device) can utilize a second communication protocol. The management component 108 can be configured to automatically translate the first protocol and the second protocol into a common protocol that can be understood by both devices (e.g., the first IoT device and the second IoT device, or non-IoT device, and so on).

According to an implementation, the controller unit 102 can operate as a gateway device (e.g., an IoT gateway device) and, at the same time, or at substantially the same time, can function as a router or access point for other network connectivity. The controller unit 102 can receive an Internet connection via a Wireless Local Area Network (WLAN) port or wirelessly. In addition, the controller unit 102 can operate as a wireless router and/or wired router for other computing devices (e.g., the non-IoT device 106 or other devices).

In accordance with an embodiment, the controller unit 102 can be coupled to a Digital Subscriber Line (DSL) modem, a cable modem, a fiber optic mode, another modem, or another Internet gateway device. Further to this embodiment, the controller unit 102 can provide access point functionality and/or switching functionality for the IoT device 104, the non-IoT device, and/or other devices that are communicably coupled to the controller unit 102. According to another embodiment, the controller unit 102 can be a bridge device that can receive an Internet connection from another access point device.

According to some implementations, the controller unit 102 can replace one or more other devices in a structure that provide connectivity to the one or more networks. For example, a router or cable modem might be utilized to enable Internet connectivity for computing devices within a house. Accordingly, all electronic devices (e.g., non-IoT devices, IoT devices, and other devices) can be connected through the controller unit 102 as a single node for network connectivity.

The at least one memory 112 can be operatively coupled to the at least one processor 114 and can store computer executable components and/or computer executable instructions. The at least one processor 114 can facilitate execution of the computer executable components and/or the computer executable instructions stored in the at least one memory 112. The term "coupled" or variants thereof can include various communications including, but not limited to, direct communications, indirect communications, wired communications, and/or wireless communications.

Further, the at least one memory 112 can store protocols associated with enabling connectivity between IoT devices, non-IoT devices, and a communications network (e.g., mobile network, Internet, one or more local networks, one or more external networks 120, and so on), providing security, selectively allowing control of one or more IoT devices, and other functions related to structure automation functionality as discussed herein. Further, the at least one memory 112 can facilitate action to control communication between the system 100, the controller unit 102, the IoT device 104, and the non-IoT device 106, other systems, other IoT devices, and/or other non-IoT devices, such that the system 100 can employ stored protocols and/or algorithms to facilitate single node network connectivity for structure automation functionality as described herein.

It is noted that although the one or more computer executable components and/or computer executable instructions can be illustrated and described herein as components and/or instructions separate from the at least one memory 112 (e.g., operatively connected to at least one memory 112), the various aspects are not limited to this implementation. Instead, in accordance with various implementations, the one or more computer executable components and/or the one or more computer executable instructions can be stored in (or integrated within) the at least one memory 112.

Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 114 can facilitate respective analysis of information related to structure automation functionality. The at least one processor 114 can be a processor dedicated to analyzing conditions and/or modifying one or more parameters based on data received, a processor that controls one or more components of the system 100, and/or a processor that both analyzes conditions and modified parameters based on data received and controls one or more components of the system 100.

Figure 2:
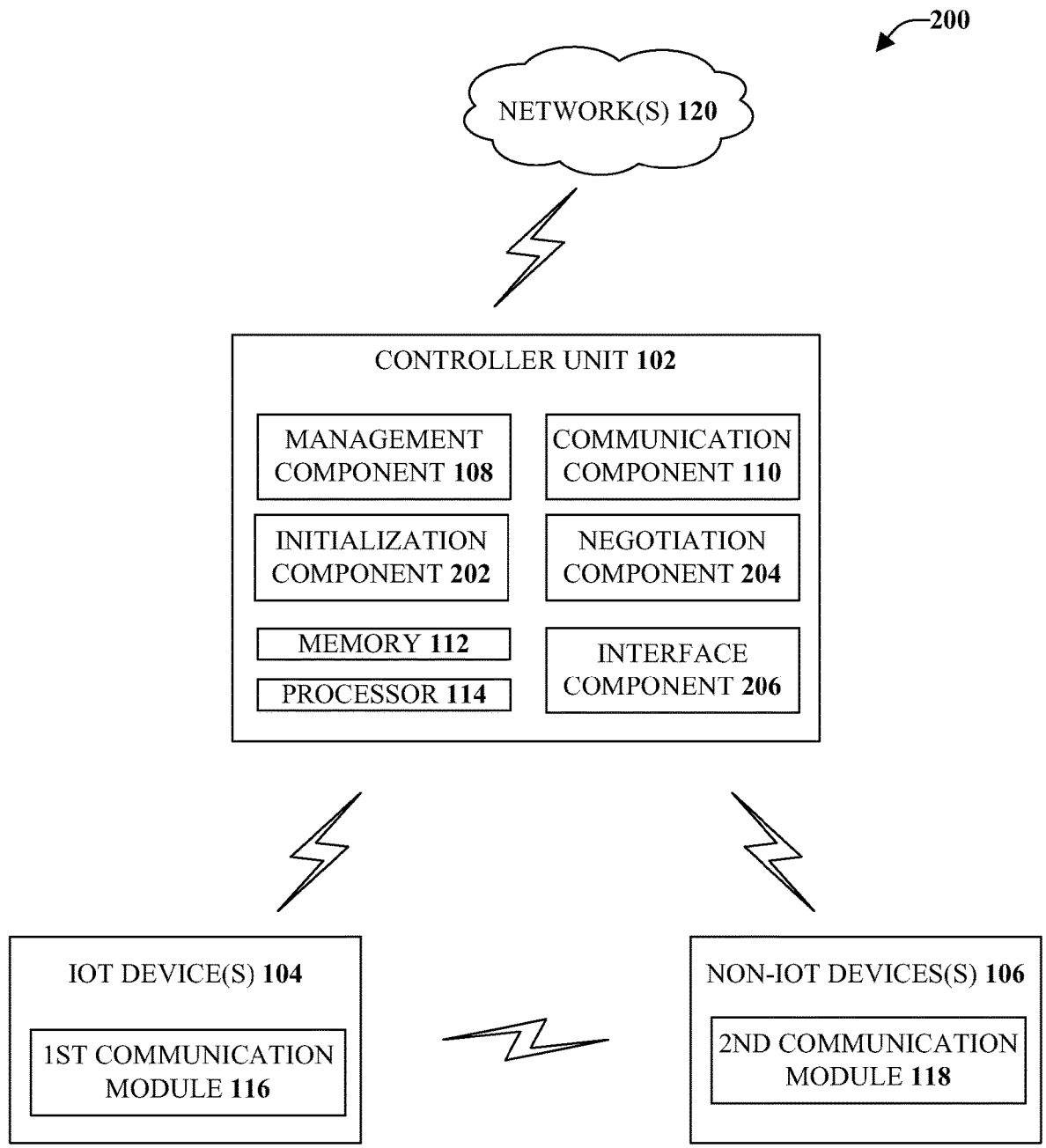
FIG. 2 illustrates an example, non-limiting, system for providing device set-up for a structure in accordance with one or more embodiments described herein.

FIG. 2 illustrates an example, non-limiting, system 200 for providing device set-up for a structure in accordance with one or more embodiments described herein. Repetitive description of like elements employed in other embodiments described herein is omitted for sake of brevity. The system 200 can comprise one or more of the components and/or functionality of the system 100, and vice versa.

Instead of authorizing every single device within the structure, an initialization component 202 can be configured to authorize the controller unit 102 to dynamically authenticate and secure the various devices (e.g., the IoT device 104, the non-IoT device 106, and other devices). Accordingly, all the devices in the structure that are capable of communication with the controller unit 102 can be secured from unauthorized access. Accordingly, the initialization component 202 can simplify the security process since each individual device does not need to be set up, which can be simple for a limited number of devices (e.g., ten or twenty devices), but which can be cumbersome when more devices, or even hundreds or thousands of devices need to be secured.

For the initialization component 202 to enable the streamlined security process, a negotiation component 204 can be configured to perform certificate authentication during a backend process. For example, an interface component 206 can be configured to allow a selection of a product that is to be added as a part of the structure automation functionality. In an example, the product can be selected from a list of products, or icons of products, and dragged or otherwise indicated to be added to a list or database of secured devices. The new device can also be named, which can be utilized as an indication of what the product is and where it is located in the structure. Examples of names can include, but are not limited to: "kitchen-overhead light," "master bath-exhaust fan," "hvac damper-play room." However, in some cases, the naming structure does not need to be exact and the name can be generic names, system generated names, and so on. Further, the names can be changed. For example, if a house is sold and the new owners use various rooms differently, the new owners can be provided the ability to change the name of the items (e.g., change from "hvac damper-play room" to "home office—air control"). This change can be facilitated by the interface component 206, for example.

Upon or after the product is added and named, the initialization component 202 can be notified to enable security for the product. Accordingly, the negotiation component 204, based on information known about the product can automatically negotiate a security certificate with a provider. Thus, the negotiation component 204 can perform the authorization process and/or the exchange of credential with the provider on behalf of the new product, or a product that has already been added but for which re-authentication is to be performed. Upon or after the security certificate has been confirmed, the data can be populated within a database or other storage media (e.g., the at least one memory 112) of the controller unit 102. According to some implementations, the initialization component and/or the negotiation component 204 can facilitate the installation and/or upgrade of applications, firmware, or other features of the devices.

In an example, a structure (or a portion of the structure) has around two thousand IoT devices. It would be impractical to introduce all of these devices individually into the security provided by the controller unit 102. Accordingly, the initialization component 202 can decouple an IoT device into its functionality and, based in part on this decoupling, can facilitate control and security of the IoT device. For example, a single product includes three sensors (e.g., a voltage sensor, a lux sensor, and an occupancy sensor). Each of the three sensors can be standard sensors that operate substantially the same as other similar sensors. Accordingly, the single product can be evaluated (e.g., by the management component 108) and subdivided into its three sensor components. The management component 108 and/or another system component can interface with each of the sensor components independently. Thus, the logic employed by the management component 108 can be established based on the individual sensors, rather than the product as a whole. Since there can be hundreds of different products that include one or more of the three sensors, or that includes other sensors, the logic can be interchanged and utilized across product lines. For example, another product can include four sensors, and a further product can include two sensors. Since the logic is based on the sensors individually, the management component 108 can be configured to communicate with the four-sensor product and the two-sensor product in a similar manner as the management component 108 communicates with the three-sensor product. Accordingly, once logic to communicate with one product (e.g., the three-sensor product) is established, since the logic is divided based on the functionality, the separate logic can be utilized to communicate with similar products (e.g., the logic can be reused).

According to some implementations, the registration and initiation can be based on an automatic commissioning, or a semi-automatic commissioning, of the products. For the automatic or semi-automatic commissioning, the presence of the new product within the structure or area of the structure can indicate that the product should be registered with the controller unit 102 and should have security through the controller unit 102. For example, the devices can be associated with a unique identifier and the controller unit 102 can be associated with a unique identifier. Thus, a class of devices (e.g., proximity sensors) can be associated with a first identifier and another class of devices (e.g., temperature sensors) can be associated with a second identifier. Further, the controller unit 102 can be associated with an identifier that is different from an identifier of other control devices that are associated with other structures and/or other areas of a structure. For example, if an office building has two control devices, each of the control devices should have a different (unique) identifier.

To automatically (or semi-automatically) commission the new products, a handshake can be performed between a sender device (e.g., the controller unit 102) and a receiver device (e.g., the new product). By way of example and not limitation, the sender has the identifier "123" and the receiver has the identifier "ABC." When initiation of the product is to be performed (e.g., when the product is removed from the box and activated for the first time), the controller unit 102 (the sender in this example) can detect that the class of product (such as a lighting element in this example). The detection can be based on a signal transmitted by the product. Thus, the sender can transmit the command "123-go-on-ABC." The light fixture (the receiver in this example), recognizes its identifier and reads the command. Based on this identification, the light fixture can be automatically registered. Further, a name can be automatically associated with the light fixture. For example, based on the location of the new product, a name can be automatically assigned. In this manner, thousands of products (e.g., light fixtures in this example) can be deployed.

Further, by having an identifier of both the sender and the receiver in the command, it can reduce the chances of hacking by an unauthorized user. For example, a person can sit in front of a building and listen, with a device, the command from a computer and attempt to access the system. However, since the first message is the address and the identifier of the product is in that address, the chances of an authorized access can be reduced. This is because both the sender identifier and the destination identifier have to be included in the command and, further, a location of the product can be identified. If the product is outside of a defined range, the product is not automatically registered.

In addition, the controller unit 102 can provide a security layer that protects the entire house or structure. The security layer can provide a level of protection for all devices within the structure so that one or more of the devices are not hacked into and cause problems (e.g., a rogue individual hacks into IoT lighting devices and flashes the lights on/off while the occupants are attempting to sleep). Thus, according to an aspect, when the identifiers of both the sender and the receiver are utilized to communicate, someone that knows what product is installed and, therefore, the corresponding identifier, might be able to sit in front of the house and attempt to control devices. However, without the ability to transmit the appropriate identifier of the controller unit 102, the chances of that person being able to tamper with the IoT devices within the house can be reduced or mitigated.

Figure 3:
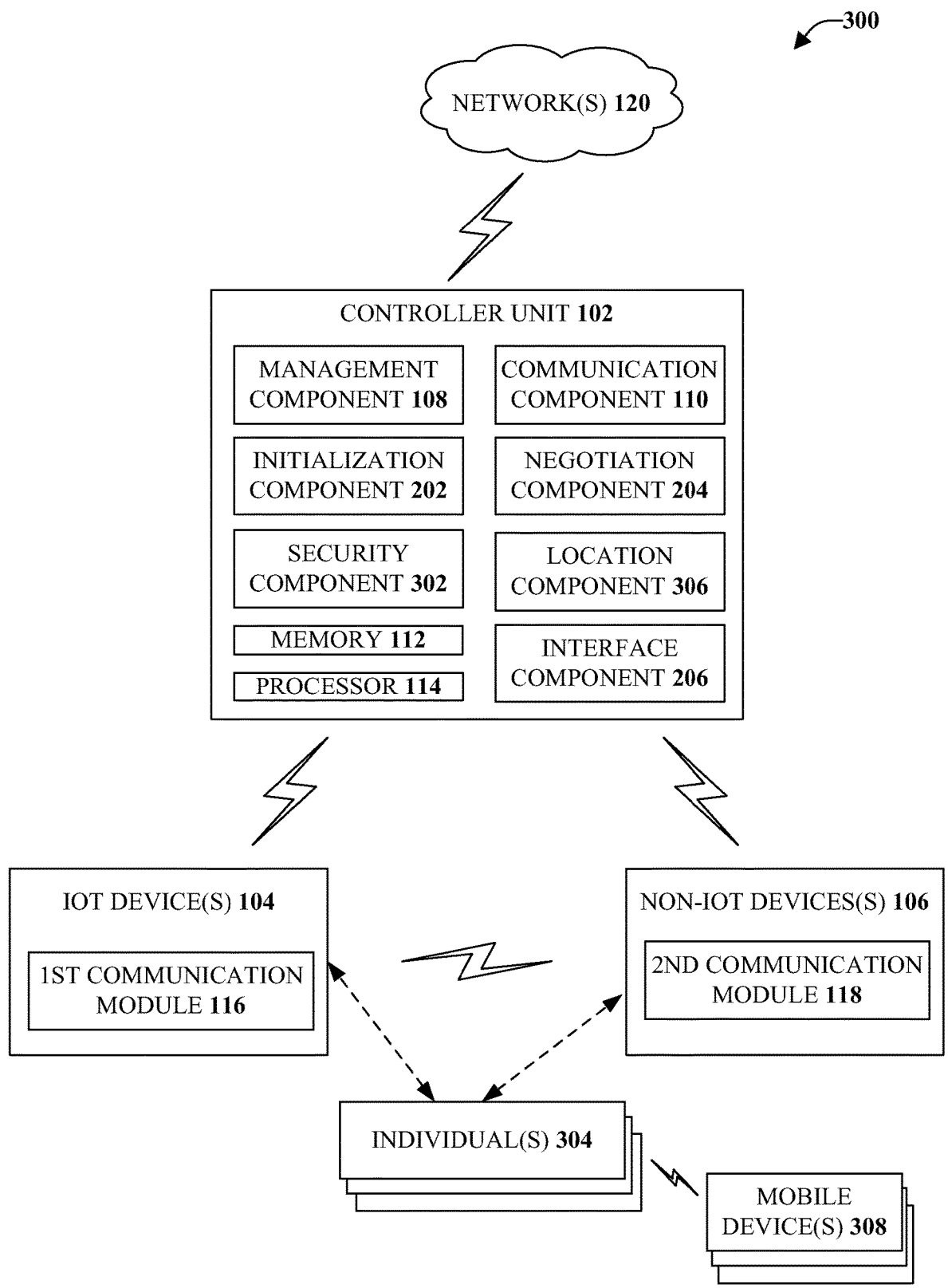
FIG. 3 illustrates an example, non-limiting, system for providing security for a structure in accordance with one or more embodiments described herein.

FIG. 3 illustrates an example, non-limiting, system 300 for providing security for a structure in accordance with one or more embodiments described herein. Repetitive description of like elements employed in other embodiments described herein is omitted for sake of brevity. The system 300 can comprise one or more of the components and/or functionality of the system 100, the system 300, and vice versa.

A security component 302 can be configured to provide overall security for all connected devices (the IoT devices and the non-IoT devices). The security can be implemented at the controller unit 102 and can encompass all devices associated with (or registered with) the controller unit 102.

According to some implementations, to implement a change to a device (e.g., the IoT device 104) at least one authorized individual 304 has to be present within a defined range of the structure (e.g., inside the structure, in a yard surrounding the structure), as determined by a location component 306. Alternatively or additionally, the change to the device (e.g., the IoT device 104) can be implemented at an authorized device. For example, if the authorized individual 304 is not located in or near the structure, the security component 302 does not implement the change unless the change has originated from an authorized device.

The authorized device can be one or more mobile devices 308 associated with the authorized individual 304. A mobile device can also be called, and can contain some or all of the functionality of a system, subscriber unit, subscriber station, mobile station, mobile, wireless terminal, remote station, remote terminal, access terminal, user terminal, terminal, wireless communication device, wireless communication apparatus, user agent, user device, or user equipment (UE). A device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

In some implementations, if there is question as to whether the change should be implemented, the management component 108, via the communication component 110, can interact with one or more authorized individuals 304 (e.g., through respective mobile devices 308) to determine if the change should be made. For example, if a change is requested by an unrecognized individual/device, a prompt can be sent via the interface component 206 to one or more authorized individuals 304 and/or one or more authorized devices (e.g., the mobile devices 308) asking if the change should be made. If the change is okay, the security component 302 can allow the change. However, if the change is not okay, a negative response to the prompt can be received and the change is not allowed. In this case, the security component 302 can maintain one or more identification information associated with the individual and/or device that requested the denied change. Thereafter, if another request is received from the individual/device for which a previous request was denied, the newly requested change can be automatically denied based on an inference that, since the prior request was denied, any future request should be denied. If it is later determined that the individual/device is authorized and can make changes, the security component 302 can change the status of the individual/device from an unauthorized state to an authorized state.

The authorization can be automatically performed. However, in some implementations, the authorization can be performed based on confirmation from another authorized individual/device. For example, if a child is requesting a change, depending on the type of device being changed, approval from a parent might be requested prior to the change being made. The determination as to whether a confirmation should be received can be based on user preferences and/or the nature of the IoT device. For example, a lighting element can be switched between on/off based on a request. However, a security system override might necessitate approval from another individual (e.g., a parent, a guardian, a security officer, and so on).

Figure 4:
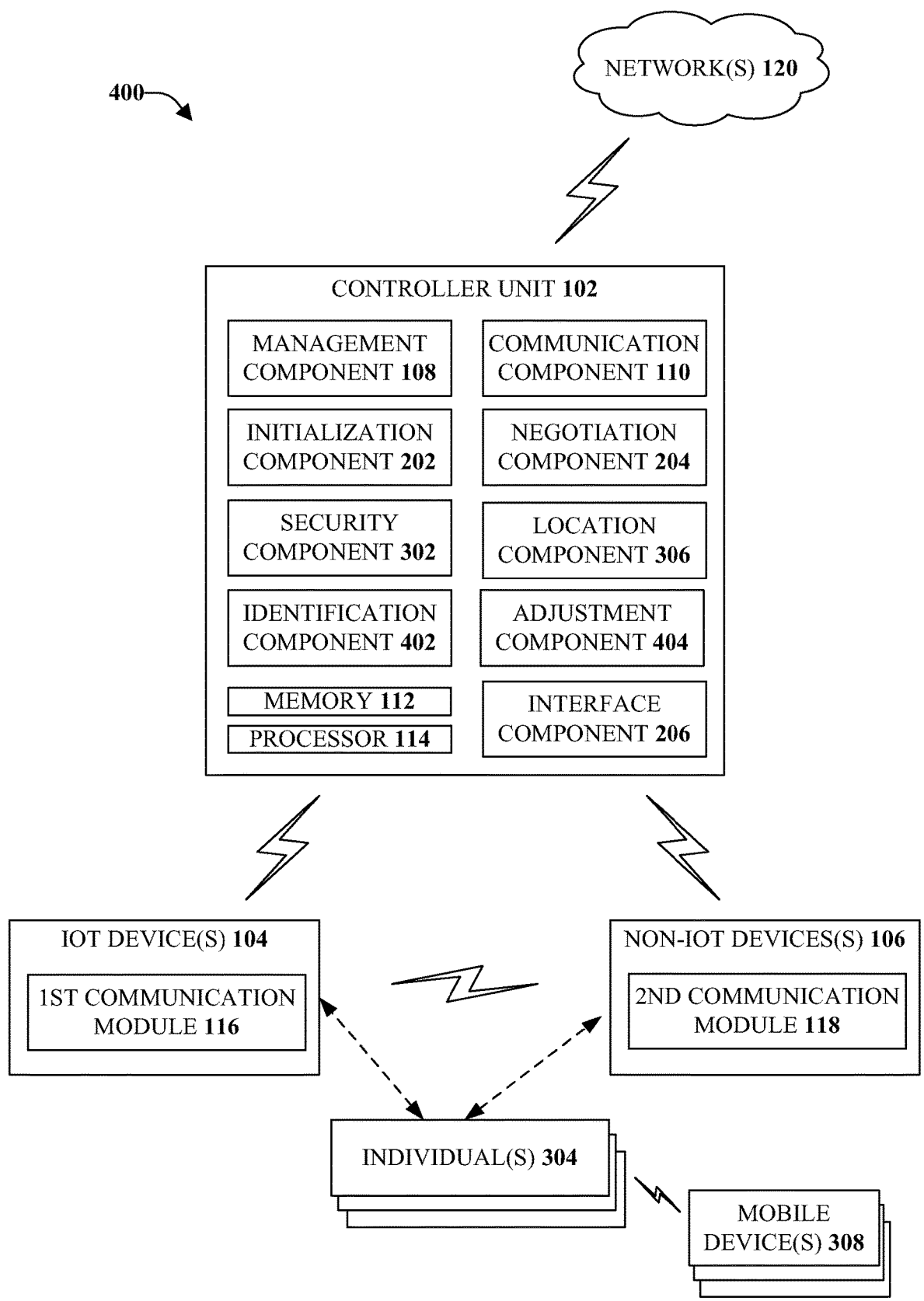
FIG. 4 illustrates an example, non-limiting, system that provides varying levels of control for connected devices in accordance with one or more embodiments described herein.

FIG. 4 illustrates an example, non-limiting, system 400 that provides varying levels of control for connected devices in accordance with one or more embodiments described herein. Repetitive description of like elements employed in other embodiments described herein is omitted for sake of brevity. The system 400 can comprise one or more of the components and/or functionality of the system 100, the system 200, the system 300, and vice versa.

The location component 306 can determine the presence of one or more individuals 304 (or animals) within a room or area of a structure. The presence can be determined based on monitoring movement within the structure. For example, movement of a specific individual can be conducted through one or more sensors that can be independent sensors and/or sensors that can be embedded in an IoT device.

An identification component 402 can be configured to identify the one or more individuals 304. The identification component 402 can determine which room is occupied based on sensors that can identify where people are, or based on whether IoT light switches have activated lights in a room. The identification component 402 can also communicate with a mobile device to determine an identification of an individual associated with the mobile device. According to some implementations, a voice signature can be utilized to identify a person. Based on the identification, a customized level of access and/or control of the various devices can be provided to the person. For example, if the person (sometimes referred to a user, individual, or entity) is a parent, full access can be provided. However, if the person is a child, only a limited amount of access might be available (e.g., can turn on the television for one hour, but cannot turn on a stove).

The presence and/or identification of the individuals can be for defined rooms, sections, lighting zones, temperature control zones, or other areas of the structure. For example, the location component 306 can interface with location sensors to determine the presence of the one or more individuals 304. The location sensors can be separate (e.g., independent) sensors and/or embedded within one or more IoT devices located throughout the structure. By having the location sensor embedded within an IoT device, a number of devices within the structure can be reduced. For example, the location component 306, through interaction with an occupancy sensor and/or a location sensor can track the one or more individuals using motion sensors, audio sensors, and/or video recorders distributed throughout the structure.

According to some implementations, the location and/or identification of the individual can be based on a device (e.g., the mobile device 308) that is carried by the individual. For example, the individual can carry a smart phone or other mobile device in their pocket or in their hand. Based on the presence of the mobile device, the location and/or identification of the individual can be inferred. In some implementations, the individual might not carry their device throughout the structure, accordingly, the location sensors distributed throughout the structure can be utilized to determine that the individual is in a first location and the associated mobile device is in a second location. For example, the user can leave her phone on her desk while she moves to another room. Based on the presence of the user in the other room for longer than a defined amount of time (e.g., 5 minutes, 10 minutes, and so on), it can be inferred that the user cannot be contacted through the associated device and, therefore, other devices within the structure should be used for communication.

In an example, the user can interact with the system 400 through her mobile device, or through a desktop device (e.g., personal computer). Thus, the interface component 206 can be associated with respective interfaces of the mobile device or other device. In an additional or alternative implementation, the location component 306 can track the location of the one or more individuals 304 based on a communication link established with respective mobile devices 308 associated with the one or more individuals 304. For example, the mobile devices can include a Global Positioning System (GPS) that can provide a location of the mobile device. In another example, location services provided by the mobile devices 308 can be utilized to track the location. Various types of communication links can be established between the mobile devices 308 and the controller unit 102, including, but not limited to Near Field Communication (NFC) and Bluetooth.

However, if the user is not in contact with these devices, at least some of the IoT devices located throughout the structure can be utilized to interface with the user. For example, the interface component 206 can interact with a smart television to instruct the television to output information to the user and/or to receive information from the user (e.g., through various sensors such as a microphone, camera, remote control, and so on.). In another example, a light bulb can be an integrated IoT device and communication to the user can be facilitated by the interface component 206 based on dimming of the light, brightening or the light, turning on or turning off the light, changing a color of the light, and so on. The user, upon or after perceiving the output of the light, can determine that a message is intended for the user. Thus, the user can interact with the device or with another device to obtain the message. In some implementations, the message can be predefined based on preferences of a user and/or based on usage of another IoT device.

According to some implementations, the interface component 206 can be utilized to control the various devices within the structure. Further, the interface component 206 can be associated with various devices and is not limited to a single control panel or a single location. For example, to control a furnace or air conditioner, a single controller or thermostat has been traditionally installed at a defined location in a house. To adjust the temperature, a user has to go to that location in the house and physically adjust the thermostat. However, with the disclosed aspects, the user does not have to rely on the single thermostat, or can eliminate the thermostat all together. Instead, the user can interface with another device to adjust the temperature.

By way of example and not limitation, the user can interface with their computing device (e.g., smart phone) to automatically adjust the temperature, even when that user is not present in the house. In another example, if the user is watching television and feels a draft, the user can interface with the television (e.g., IoT device) to change the temperature without having to stop the program. Accordingly, the television and the controller (or the furnace/air conditioner) can communicate to facilitate the change.

In another example, a user has placed a laundry load in a washing machine and/or clothes dryer and has become distracted (e.g., watching television, playing with his children, mowing the lawn, and so on). The laundry load has finished and, because the user is doing something else, the user has forgotten about the laundry. Accordingly, the washing machine (or clothes dryer) can send a signal to the user that the laundry is finished. For example, if the user is watching television, the signal can be relayed from the washing machine to the television (e.g., through the controller unit 102) and the television can output a message (e.g., a written message on the screen, an audible message, blinking lights, or another type of communication). If the user is playing with his children, the message can be in the form of blinking lights or through an intercom or audio system. In another example, if the user is mowing his lawn, the notification can be through headphones, through a communications device on the lawn mower, or can be rendered through other means of attracting the attention of the user.

Further, the user can interact with the washing machine or clothes dryer. For example, if a signal is provided notifying the user that the clothes dryer cycle has completed, the user can be in a situation where he cannot attend to folding the clothing. Therefore, the user can request that the clothes dryer enter a wrinkle free mode and provide a later notification. In an example, the user can provide the instruction through an IoT device, which can relay the instruction to the clothes dryer in this example.

According to some implementations, an identification component 402 can determine which person is present in the structure. In an example, the identification component 402 can obtain information related to the individuals 304 from the mobile devices 308. In another example, the identification component 402 can make the determination based on voice signatures (captured by sensors embedded in one or more IoT devices) that are associated with different individuals. For example, voice signatures can be captured from different individuals that reside in a house, that work in an office, or that are associated with the structure. Further, the identification can include various other forms of recognition (e.g., facial, voice signature, fingerprint readers, retinal scanners, and so on), depending on the sensors that are incorporated throughout the structure.

According to some implementations, the controller unit 102 can be configured as a common interface to allow control of all connected devices within the structure. For example, the controller unit 102 can be configured to determine an identity of person (e.g., via the identification component 402) within the structure and can change one or more device configurations for that person. For example, music that is playing can be changed based on the preferences of the user. In another example, lighting and/or temperature in a house can be changed based on preferences of the user.

As discussed, the controller unit 102 can be configured to convert wireless sensors (e.g., associated with the devices) automatically into the IoT infrastructure (e.g., part of the subsystem). Thus, with the controller unit 102, devices that are not IoT ready can be configured to be capable of IoT communications. For example, the controller unit 102 can be configured to auto-negotiate various security certificates and security keys with a service provider. The controller unit 102 can provide the features and functionalities to enable the opportunity for that type of system to be deployed in a larger commercial scale (e.g., thousands of devices) as well as for a residential property with a smaller number of devices or products.

For example, in accordance with some implementations, to automatically configure and register devices with the controller unit 102, a location component 306 can determine if one or more authorized individuals are making the request and/or if the request is received from an authorized device. For example, it can be inferred that the individual is making the request if the individual is physically located in the structure and/or if the request has been approved through a device associated with the authorized individual. Thus, if the authorized individual/device is requesting that the new product be registered, the registration can be automatically completed by the initialization component 202. However, if the identification component 402 does not recognize the individual and/or the device, the registration of the product can be denied. Alternatively, a notification can be sent to the authorized individual/device for confirmation of the product registration. If approval is received, the product can be registered. If no approval is received, or if a denial is received, the registration of the product is not performed.

The interface component 206 (as well as other interface components discussed herein) can provide, a command line interface, a speech interface, Natural Language text interface, and the like. For example, a Graphical User Interface (GUI) can be rendered that provides a entity (e.g., a user, an individual) with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the conveyance of information, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Programming Interface (API). In addition, the command line interface can be employed in connection with hardware (e.g., video cards) and/or displays (e.g., black and white, and Video Graphics Array (EGA)) with limited graphic support, and/or low bandwidth communication channels.

An adjustment component 404 can be utilized to facilitate a requested change to one or more IoT devices. Individuals within the structure can be associated with a level of control. For example, in a house, parents can have full control of all devices within the house and children can have a limited amount of control. Thus, the control of parents can override control of the children based on a conflict associated with the change. However, the disclosed aspects are not limited to this implementation. For example, one parent can have full control (e.g., a stay at home dad), while the other parent has control of various aspects only while she is located in the house. In another example, a child can have full control of devices within her room (e.g., control of lights, temperature, and so on).

According to some implementations, the control can be relinquished to another family member. For example, the parents can go out for the evening and can instruct the controller unit 102 (or the adjustment component 404) that the oldest child has control of the devices.

In another example, the control can be implemented with the security component 302. For example, an elderly person resides in the house with his adult children and the elderly person has a habit of turning on a gas stove to cook food, but has been known to leave the gas burner on, which can cause a fire. The gas stove can be controlled, through the security component 302 to not allow the elderly person to turn on the gas stove when he is home alone. Alternatively, or additionally, one or more sensors in the kitchen can detect the presence of items on the stove (e.g., oven mitten) that would cause a fire hazard. If an object is on or near the stove, the gas stove cannot be turned on. However, if no objects are detected, or if only a pot or pan is on the gas stove, the gas stove can be turned on. However, if a dangerous situation is detected by the sensor, the gas stove can be automatically turned off, or can be turned off after a defined amount of time, or if the person has left the kitchen. In another example, if the elderly person turns on the gas stove and one of the adult children are in the home, a notification can be provided to the adult child so that s/he is aware that the gas stove is on and can monitor the situation.

Figure 5:
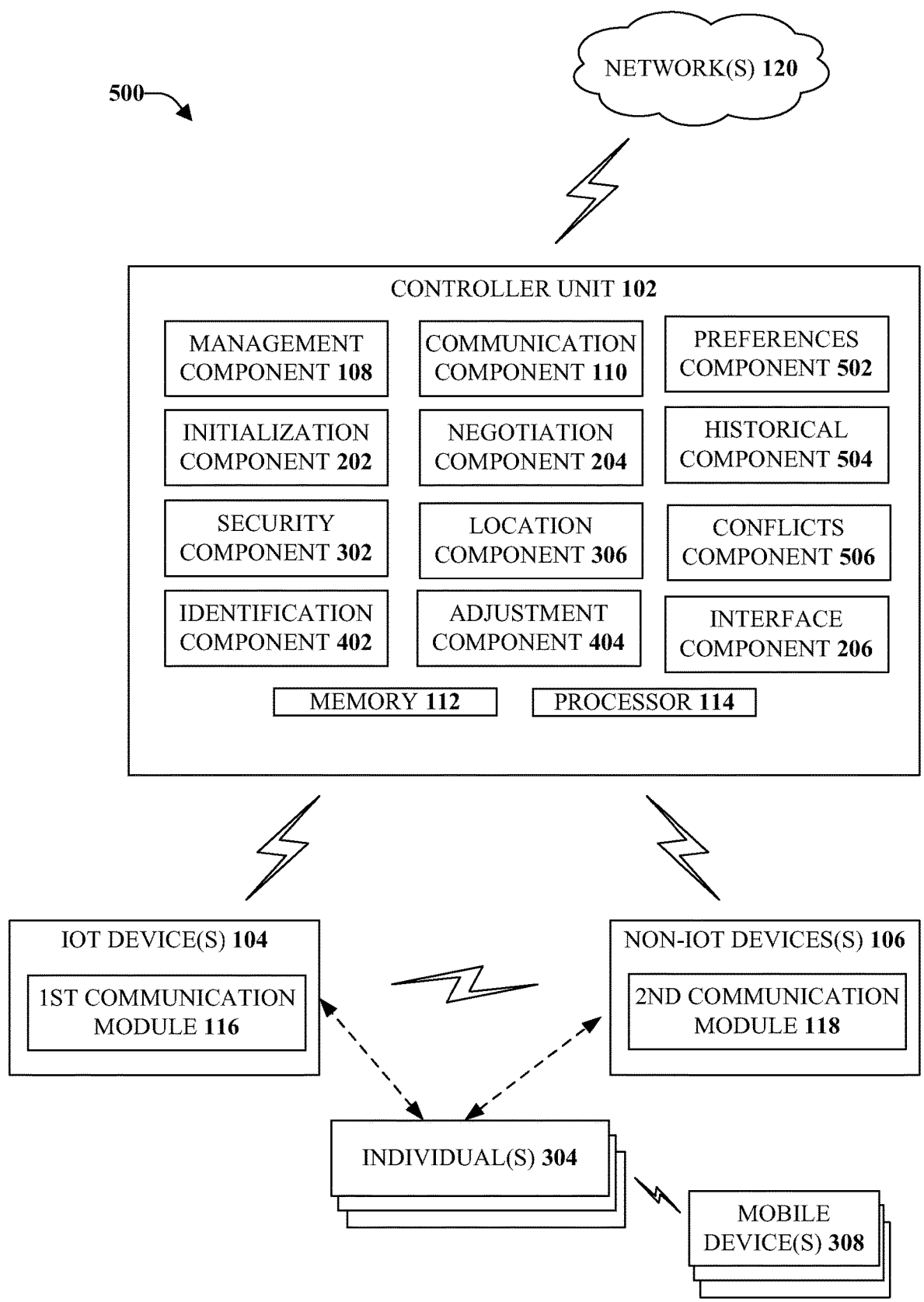
FIG. 5 illustrates an example, non-limiting, system for providing quality of service through a single node device that facilitates communication of connected devices in accordance with one or more embodiments described herein.

FIG. 5 illustrates an example, non-limiting, system 500 for providing quality of service through a single node device that facilitates communication of connected devices in accordance with one or more embodiments described herein. Repetitive description of like elements employed in other embodiments described herein is omitted for sake of brevity. The system 500 can comprise one or more of the components and/or functionality of the system 100, the system 200, the system 300, the system 400, and vice versa.

According to an implementation, the controller unit 102 can manage Quality of Service (QOS) functionality for the devices (e.g., the IoT device 104, the non-IoT device 106, and other devices) that are communicably coupled to the controller unit 102. A preferences component 502 can obtain or can determine one or more preferences of identified individuals. For example, a person, such as a homeowner, can interface with the system (e.g., via the interface component 206) and can enter a preference related to one or more IoT devices. For example, a preference can be a temperature setting, a lighting setting (e.g., which lights should be turned on when the user enters or is in a room), an audio setting for speakers associated with music playing in a room, a type of music that should be played, and other preferences. The defined preferences of the one or more identified individuals can be retained, such as in the at least one memory 112.

For example, based on the determination or identification of the individual, the preferences component 502 can match the identified individual to a temperature preference of the individual. For example, the controller unit 102 can retain (e.g., in the at least one memory 112) preferences defined by the individual. According to some implementations, the mobile device associated with the individual can retain the preferences (e.g., in a memory) and convey the information to the controller unit 102. The defined temperature level can be based on a configurable temperature setting determined as a function of an individual. For example, preferences can be built into user accounts that are associated with mobile devices, and as a person moves throughout the house, the preferences can track the person such that the furnace can heat rooms differently based on whether the person is in the room.

According to some implementations, the interface component 206 can facilitate selection of one or more parameters associated with the remote devices as discussed herein. Further, the mobile devices can comprise respective interface components that can facilitate the entry and/or adjustment of parameters associated with the remote devices.

Further, a historical component 504 can retain additional information related to the one or more individuals. The additional information can be a change to a defined preference or a preference entered by the defined individual. According to some implementations, the additional information can supplement the defined preference. For example, the preferences can be based on historical data related to the identified individual (e.g., the individual has historically turned on a particular lamp upon entering a room, the individual has historically adjusted a thermostat to a certain temperature). In another example, the preferences can be based on explicit preferences received from the individual. For example, through various interface components, the individual can be prompted for preferences and such preferences can be maintained at the controller unit 102 and/or at a mobile device(s) associated with the individual.

A conflicts component 506 can resolve a conflict related to two or more preferences. For example, the conflicts component 506 can determine a first user's preferences supersedes a second user's preferences and, therefore, can apply the first user's preferences when there is a conflict. In the above example, the first user can be a parent and the second user can be a child. In another example, a home automation system is playing two different songs for two people through a home-wide sound system, and playing music back in different rooms while tracking movement of the two people. When the two people enter the same room, the conflicts component 506 can determine that the music playback for the second person should stop, while the music playback for the first person can keep playing.

According to some implementations, settings and/or preferences can be set for both the IoT devices connected on the IoT BACnet and other computing devices (e.g., non-IoT devices) through a settings interface (e.g., via the interface component 206) of the controller unit 102. The controller unit 102 can be accessible by the IoT devices and the other devices on the network. Preferences can include access privileges, quality of service preferences, and other setting that can be adjusted and modified.

Figure 6:
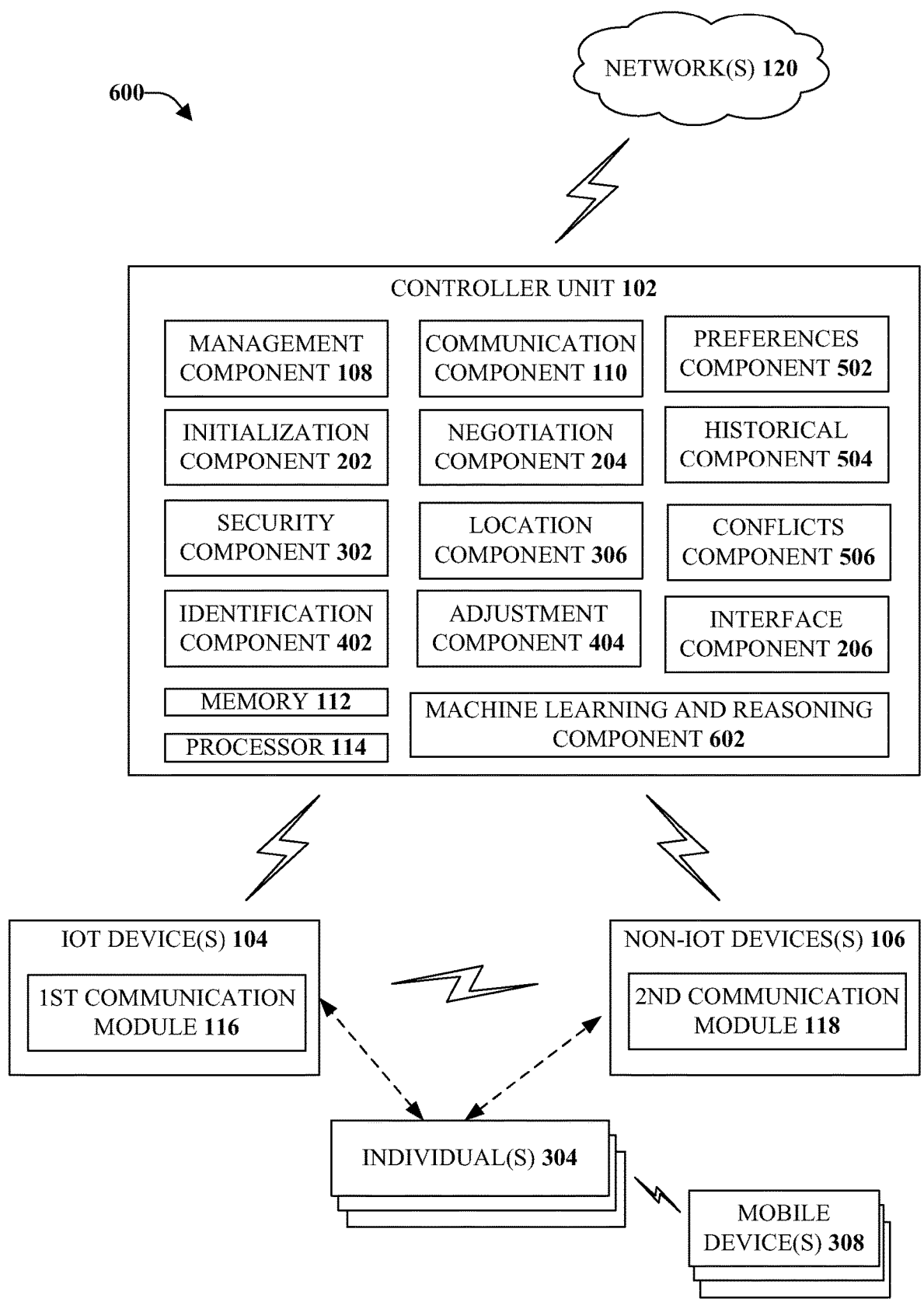
FIG. 6 illustrates an example, non-limiting, system that employs machine learning to automate structure automation functionality in accordance with one or more embodiments described herein.

FIG. 6 illustrates an example, non-limiting, system 600 that employs machine learning to automate structure automation functionality in accordance with one or more embodiments described herein. Repetitive description of like elements employed in other embodiments described herein is omitted for sake of brevity. The system 600 can comprise one or more of the components and/or functionality of the system 100, the system 200, the system 300, the system 400, system 500, and vice versa.

The system 600 can include a machine learning and reasoning component 602, which can be utilized to automate one or more of the disclosed aspects. The machine learning and reasoning component 602 can employ automated learning and reasoning procedures (e.g., the use of explicitly and/or implicitly trained statistical classifiers) in connection with performing inference and/or probabilistic determinations and/or statistically-based determinations in accordance with one or more aspects described herein.

For example, the machine learning and reasoning component 602 can employ principles of probabilistic and decision theoretic inference. Additionally or alternatively, the machine learning and reasoning component 602 can rely on predictive models constructed using machine learning and/or automated learning procedures. Logic-centric inference can also be employed separately or in conjunction with probabilistic methods.

The machine learning and reasoning component 602 can infer, whether a new product or device should be automatically registered with, and secured by, the management component 108, whether a status of an environment of one or more IoT devices and/or one or more non-IoT devices should be adjusted based on a quality of service parameter and/or an observed condition. Based on this knowledge, the machine learning and reasoning component 602 can make an inference related to one or more changes that should be implemented based on configurable preferences and/or configurable input parameters related to conditions of the environment, quality of service parameters, authorization levels, security levels, and so on.

As used herein, the term "inference" refers generally to the process of reasoning about or inferring states of the system, a component, a module, the environment, an IoT device, and/or a non-IoT device from a set of observations as captured through events, reports, data, and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects, for example, in connection with controlling one or more IoT devices and/or non-IoT devices to provide structure automation functionality can employ various artificial intelligence-based schemes for carrying out various aspects thereof. For example, a process for determining if an IoT device is new and should be automatically configured, or whether a parameter of an IoT device should be changed based on an presence, or an absence of, a particular individual can be enabled through an automatic classifier system and process. Such considerations can also take into consideration the presence of one or more individuals as well as control levels and/or preferences of those individuals.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistically-based analysis (e.g., factoring into the analysis utilities and costs) to prognose or infer an action that should be employed to determine how to modify a functionality of an IoT device when confronted with a selection between two or more functionalities (e.g., two individuals are in the same room). In the case of IoT devices, for example, attributes can be identification of individuals, and the classes can be defined preferences of the individuals and priority of preferences when two or more individuals are in the same or a similar location with the structure.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording an individual's behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining according to a predetermined criteria which IoT devices to activate or deactivate, a determination of which IoT devices should operate together, and so forth. The criteria can include, but is not limited to, similar user preferences, related information, and so forth.

Additionally or alternatively, an implementation scheme (e.g., a rule, a policy, and so on) can be applied to control and/or regulate IoT devices and resulting actions, inclusion of one or more IoT devices (e.g., a smoke detector and an illumination device) to determine how to modify a IoT device to control an environment, and so forth. In some implementations, based upon a predefined criterion, the rules-based implementation can automatically and/or dynamically interpret individual preferences. In response thereto, the rules-based implementation can automatically interpret and carry out functions associated with the individual preferences and output appropriate modifications to IoT devices by employing a predefined and/or programmed rule(s) based upon any desired criteria.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram. According to some implementations, a machine-readable storage medium, comprising executable instructions that, when executed by a processor, facilitate performance of the methods. According to other implementations, a non-transitory computer-readable medium, comprising executable instructions that, when executed by a processor, facilitate performance of the methods.

Figure 7:
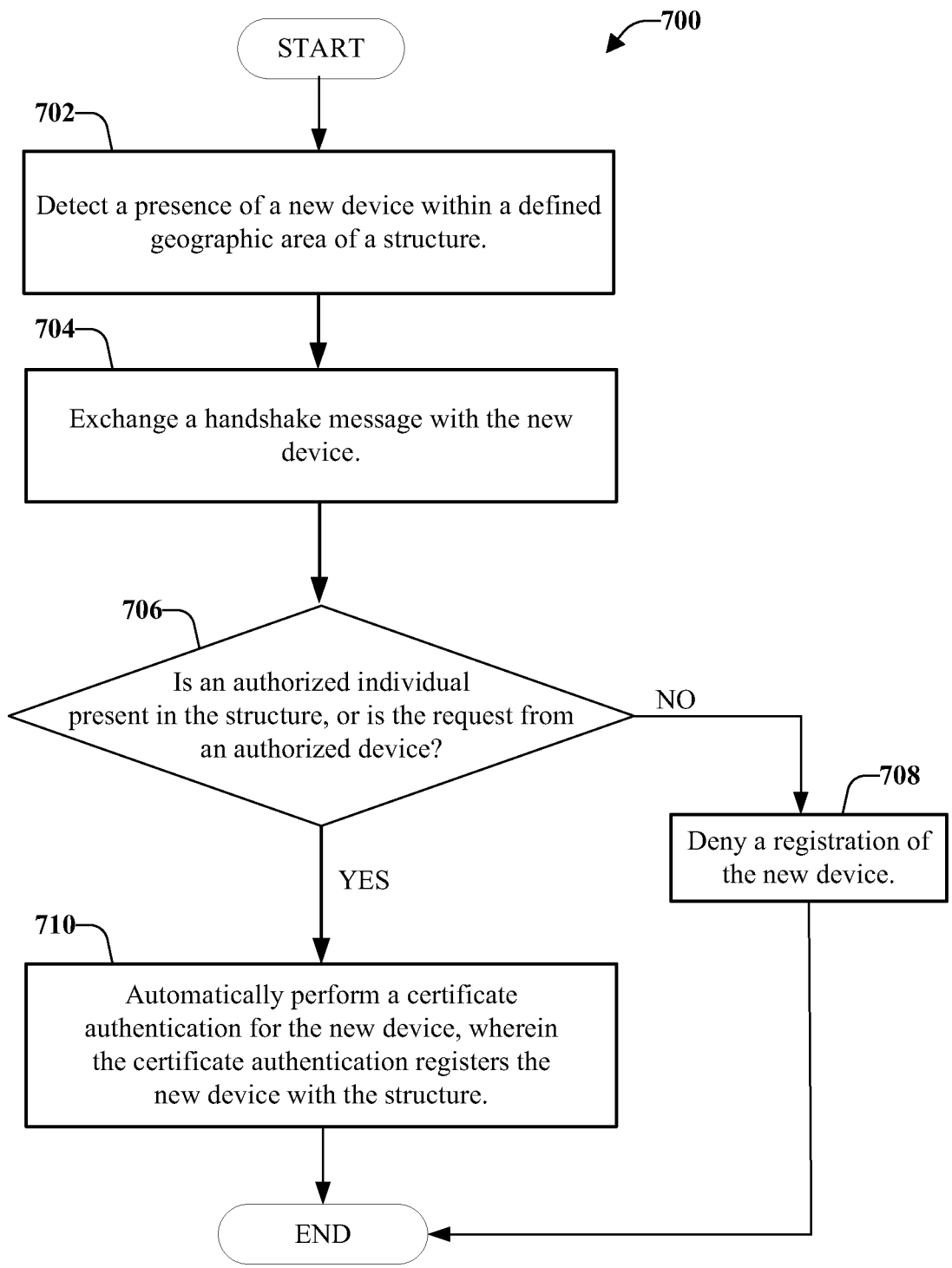
FIG. 7 illustrates an example, non-limiting, method for facilitating initialization and security of one or more electronic devices within a structure through a single communication node for structure automation functionality in accordance with one or more embodiments described herein.

FIG. 7 illustrates an example, non-limiting, method 700 for facilitating initialization and security of one or more electronic devices within a structure through a single communication node for structure automation functionality in accordance with one or more embodiments described herein. Repetitive description of like elements employed in other embodiments described herein is omitted for sake of brevity.

The method 700 starts at 702, when a presence of a new device within a geographic area of a structure is detected. According to some implementations, the detection can be of a multitude of new devices within the geographic area of the structure. The detection can be based on a signal output by the one or more new devices, for example.

At 704, a message is exchanged with the new device(s). For example, the message can be between the new device(s) and a controller unit (e.g., the controller unit 102 of FIG. 1). According to some implementations, the message can be a handshake message. For example, the handshake can be performed between a sender device (e.g., the controller unit) and a receiver device (e.g., the new device). By way of example and not limitation, the sender can have a first identifier (e.g., centralunitABZ) and the receiver can have a second identifier "IoTDevice19." Each receiver device or new device can have a different identifier than the other new devices. When the new device is activated for a first time within the structure, the class or type of the device can be detected based on the second identifier (and subsequent identifiers of the other new devices) that can be transmitted by the new device. Based on receipt of the signal, the sender can transmit a command such as, centralunitABZ-turn-on-IoTDevice19. The new device can recognize its identifier (e.g., IoTDevice19), read the command, and automatically be registered. By having an identifier of both the sender and the receiver in the command, and in subsequent commands or messages between the various devices, the chances of hacking by an unauthorized user can be reduced or mitigated.

According to some implementations, the new device can be automatically registered based on the new devices being located within the structure. However, according to some implementations, the method 700 continues at, 706, with a determination whether an authorized individual is present within the structure and/or if the request is from an authorized device (e.g., a mobile device associated with the authorized individual). If the individual is not in the structure and/or if the device is not an authorized device ("NO"), it can indicate that an attempt is being made to perform an authorized use of the system. Therefore, at 708, a registration of the new device is denied.

However, if the authorized individual is in the structure and/or the device is authorized, at 710, a certificate authentication can be automatically performed. The certificate authentication can be utilized to automatically register the new device as a device of the structure. Therefore, the new device can be included in the security of the controller unit.

Figure 8:
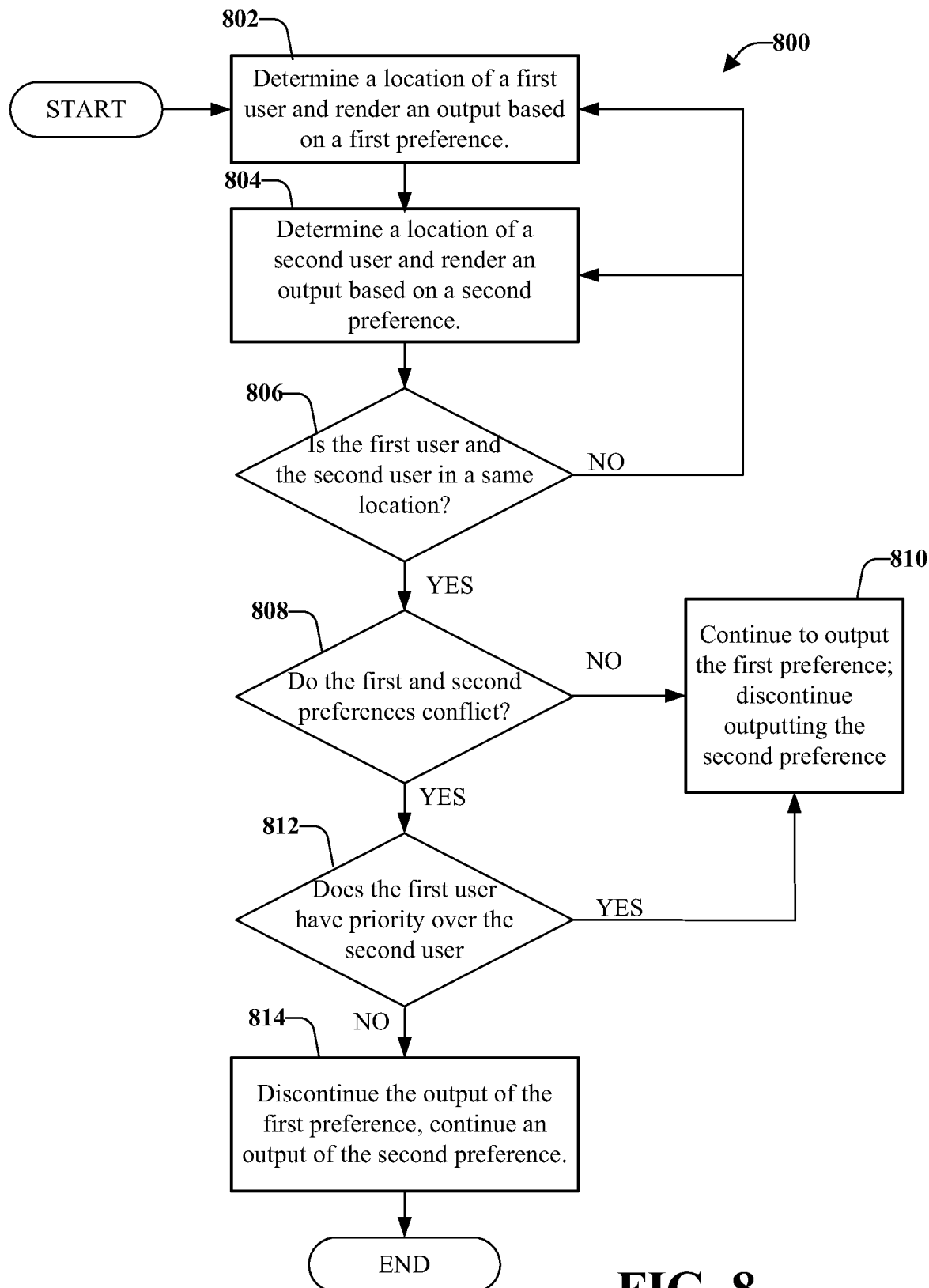
FIG. 8 illustrates an example, non-limiting, method for resolving quality of service conflicts of various devices within a structure in accordance with one or more embodiments described herein.

FIG. 8 illustrates an example, non-limiting, method 800 for resolving quality of service conflicts of various devices within a structure in accordance with one or more embodiments described herein. Repetitive description of like elements employed in other embodiments described herein is omitted for sake of brevity.

At 802, a location of a first user can be determined. Based on the location of the first user, a rendering of an output, based on defined preferences (e.g., a first preference) of the first user, can be provided at the location of the first user. In an example, rendering the output can include, but is not limited, to outputting music or other audible signals through speakers distributed within the structure.

A location of a second user can be determined, at 804. Based on the location and a defined preference (e.g., a second preference) of the second user, rendering of an output (e.g., appropriate audible signals) can be output at the location of the second user. By way of example, the first user can be a parent and the second user can be a child. However, the disclosed aspects are not limited to this implementation and the user can be anyone for which preferences are known. Further, the various aspects can be utilized for more than two users if a conflict is detected.

At 806, a determination is made whether the first user and second user are in a same location (e.g., a same room) within the structure. If not ("NO"), output for the individual users is continued at 802 and 804. If the determination is that the users are in the same location ("YES"), at 808, a determination is made whether there is a conflict between the first preference and the second preference. For example, the first user (the parent) could be listening to talk radio and the second user (the child) could be listening to music. However, in some cases, the preferences can be the same (e.g., friends living together in a same apartment, co-workers that like the same music, and so on). Thus, if there is no conflict determined at 808 ("NO"), preferences of the first user can be continued to be output. Further, at 810, output of the preferences of the second user can be discontinued.

If the determination, at 808, is that there is a conflict ("YES"), at 812, a determination is made whether the first user has priority over the second user. The priority determination can be made based on defined criteria. For example, a parent can have priority over a child. However, if it is the child's birthday, the child can have priority on his birthday, or during the week of his birthday. In another example, the priority can be dynamically changed based on a rotating basis. For example, the first user has priority in a first instance, during a second instance the second user has priority, during a third instance the first user has priority, and so on.

If the determination at 812 is that the first user has priority (YES"), at 810, output of the first preference is continued and output of the second preference is discontinued. This output can occur until a determination is made that the users are not in the same location or area of the structure. However, if the determination at 812 is that the first user does not have priority ("NO"), at 814, the output of the first preference is discontinued and output of the second preference is continued at the same location. When the users are not longer in the same area or location of the structure, the appropriate output based on preferences of the users can be rendered at the different areas.

Figure 9:
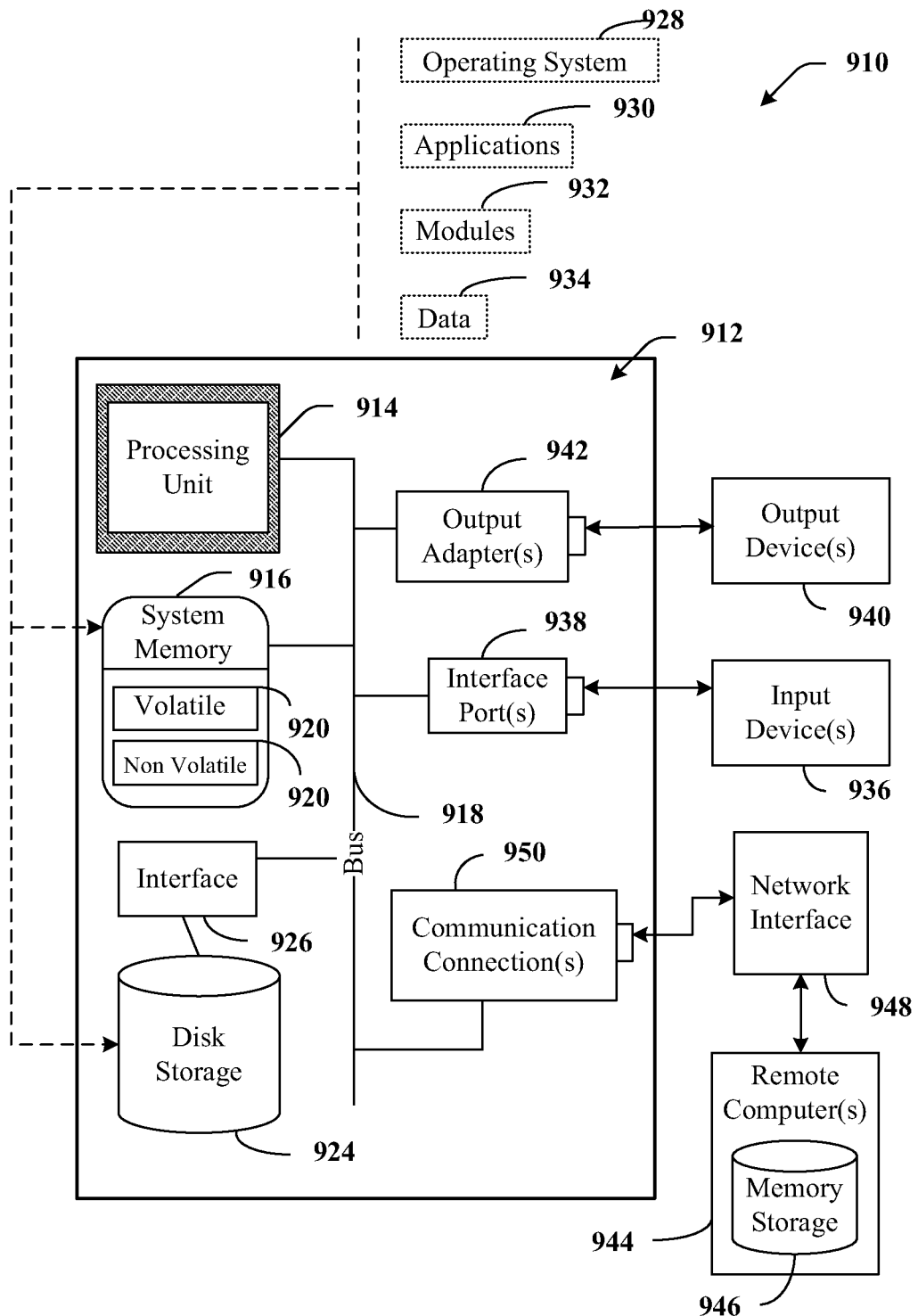
FIG. 9 illustrates an example, non-limiting, computing environment in which one or more embodiments described herein can be facilitated.
Figure 10:
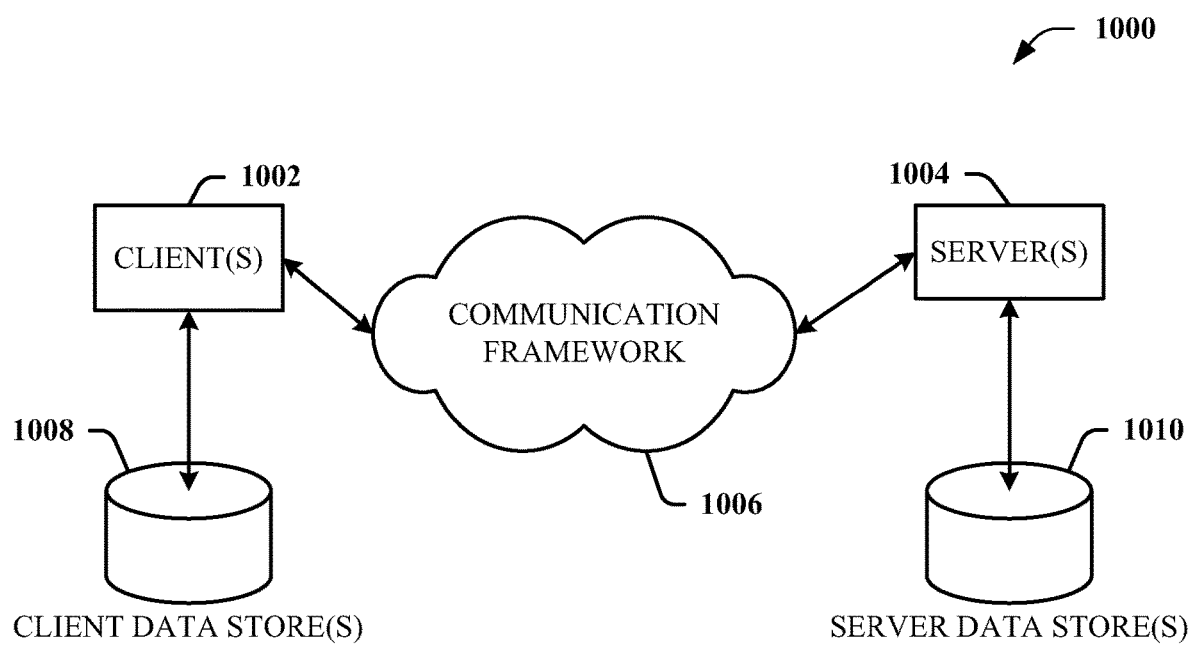
FIG. 10 illustrates an example, non-limiting, networking environment in which one or more embodiments described herein can be facilitated.

In order to provide a context for the various aspects of the disclosed subject matter, FIGS. 9 and 10 as well as the following discussion are intended to provide a brief, general description of a suitable environment in which the various aspects of the disclosed subject matter can be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory that stores executable components; and
   a processor, operatively coupled to the memory, that executes the executable components, the executable components comprising:
   a management component that facilitates a communication with electronic devices within a structure, wherein at least one electronic device of the electronic devices is classified as an internet of things device;
   an identification component that determines an individual authorized to provide security approval of the at least one electronic device;
   a security component that notifies an initialization component that the individual is authorized to provide the security approval to the at least one electronic device;
   the initialization component that enables a streamlined security process based on an indication that the at least one electronic device is to be registered with the management component, and that the individual is physically located within a defined range of the structure; and
   a negotiation component that performs a certificate authentication for the at least one electronic device, wherein the certificate authentication is automatically performed with a certificate authority during a backend process, and wherein the communication by the at least one electronic device is facilitated through the management component based on a successful certification authentication by the negotiation component.

2. The system of claim 1, wherein the executable components further comprise:
   a conflicts component that resolves a conflict between a first preference associated with a first entity and a second preference associated with a second entity, wherein the first preference and the second preference are different setting preferences of the at least one electronic device.

3. The system of claim 1, wherein the executable components further comprises:
   a location component that determines a location of a first entity and a second entity within the structure;
   a preferences component that determines a conflict between a preference of the first entity and the second entity based on a determination that the first entity and the second entity are located in a same area of the structure; and
   a conflicts component that determines a priority between the first entity and the second entity and outputs signals based on the priority, wherein the preference of the first entity is output based on the first entity having priority over the second entity, and the preference of the second entity is output based on the second entity having priority over the first entity.

4. The system of claim 1, wherein the executable components further comprise a communication component that facilitates communications between the electronic devices within the structure and devices external to the structure and accessible over an Internet connection enabled by the management component.

5. The system of claim 4, wherein the management component couples with a modem to establish the Internet connection, and wherein the communication component provides access point functionality for the at least one electronic device based on the Internet connection.

6. The system of claim 4, wherein the management component couples with an Internet gateway device to establish the Internet connection, and wherein the communication component provides access point functionality for the at least one electronic device based on the Internet connection.

7. The system of claim 1, wherein the executable components further comprise a presence component that determines a location of the individual; and the security component notifies the initialization component that the individual is within the defined range of the structure.

8. The system of claim 7, further comprising at least one sensor associated with the at least one electronic device, wherein the at least one sensor determines a presence of the individual.

9. The system of claim 1, wherein the executable components further comprise:

a conflicts component that resolves a conflict between a first preference associated with a first entity and a second preference associated with a second entity, wherein the first preference and the second preference are different setting preferences of the at least one electronic device.

10. A method, comprising:

facilitating, by a system comprising a processor, a communication link between a controller unit, a first device, and a second device within a structure;

receiving, by the system, a notification identifying an individual that is authorized to provide authentication approval of devices within the structure;

negotiating, by the system, based on a determination that the individual is physically located within a defined range of the structure, a first authentication of the first device and a second authentication of the second device during a backend process of the controller unit, wherein a manual configuration of the first device and the second device is bypassed; and providing, by the system, security of the first device and the second device based on a registration with the controller unit, wherein the registration is enabled based on the first authentication and the second authentication.

11. The method of claim 10, further comprising:

determining, by the system, a first location of a first entity within the structure and a second location of a second entity within the structure;

rendering, by the system, a first output of the first device based on a first preference of the first entity, wherein the first device and the first entity are at the first location; and rendering, by the system, a second output of the second device based on a second preference of the second entity, wherein the second device and the second entity are at the second location.

12. The method of claim 11, further comprising:

determining, by the system, the second entity has moved to the first location; and resolving, by the system, a conflict between the first preference and the second preference for output by the first device.

13. The method of claim 10, further comprising:

enabling, by the system, an Internet connection through the controller unit; and facilitating, by the system, communications between the first device and the second device to devices external to the structure and accessible over the Internet connection.

14. The method of claim 13, further comprising:

establishing, by the system, a connection between the controller unit, the first device, and the second device over the Internet connection based on a coupling of the controller unit with a modem.

15. The method of claim 13, further comprising:

facilitating, by the system, access point functionality for the first device and the second device based on a coupling of the controller unit with an Internet gateway device.

16. A non-transitory machine-readable medium, comprising executable instructions that, when executed by a processor, facilitate performance of operations, comprising:

establishing a communication with electronic devices within a structure, wherein at least one electronic device of the electronic devices is classified as an internet of things device;

receiving a notification identifying an individual that is authorized to provide security approval of the at least one electronic device;

enabling a streamlined security process based on an indication that the at least one electronic device is to be registered, and that the individual is physically located within a defined range of the structure; and performing a certificate authentication for the at least one electronic device, wherein the certificate authentication is automatically performed with a certificate authority during a backend process, and wherein the communication by the at least one electronic device is facilitated based on a successful certification authentication.

17. The non-transitory machine-readable medium of claim 16, the operations further comprising:

determining a first location of a first entity within the structure and a second location of a second entity within the structure;

rendering a first output of a first device based on a first preference of the first entity, wherein the first device and the first entity are at the first location; and rendering a second output of a second device based on a second preference of the second entity, wherein the second device and the second entity are at the second location.

18. The non-transitory machine-readable medium of claim 17, the operations further comprising:

determining the second entity has moved to the first location; and resolving a conflict between the first preference and the second preference for output by the first device.

19. The non-transitory machine-readable medium of claim 16, the operations further comprising:

facilitating communications between the electronic devices and devices external to the structure and accessible over an Internet connection based on an enablement of the Internet connection, wherein the electronic devices are classified as internet of things devices.

20. The non-transitory machine-readable medium of claim 16, the operations further comprising:

determining a location of the individual.

* * * * *